(12) United States Patent
Johns et al.

(10) Patent No.: US 9,483,424 B1
(45) Date of Patent: Nov. 1, 2016

(54) PERIPHERAL COMPONENT INTERCONNECT EXPRESS (PCIE) PSEUDO-VIRTUAL CHANNELS AND NON-BLOCKING WRITES

(71) Applicant: International Business Machines Corporation, Armonk, NY (US)

(72) Inventors: Charles R. Johns, Austin, TX (US); Eric N. Lais, Georgetown, TX (US); Jeffrey A. Stuecheli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,082

(22) Filed: Dec. 4, 2015

(51) Int. Cl.
*G06F 13/42* (2006.01)
*G06F 13/16* (2006.01)

(52) U.S. Cl.
CPC ....... *G06F 13/1673* (2013.01); *G06F 13/4282* (2013.01); *G06F 2213/0026* (2013.01)

(58) Field of Classification Search
CPC .......... G06F 13/1673; G06F 13/4282; G06F 2213/0026
See application file for complete search history.

(56) References Cited

U.S. PATENT DOCUMENTS

| 7,165,131 B2 | 1/2007 | Creta et al. |
| 7,809,006 B2 | 10/2010 | Towles |
| 8,494,059 B1 * | 7/2013 | Guan et al. .......... H04N 19/423 348/51 |
| 8,745,287 B2 | 6/2014 | Shima |
| 2015/0378737 A1 * | 12/2015 | Debbage et al. ... G06F 12/0875 712/225 |
| 2016/0055084 A1 * | 2/2016 | Rangaswami et al. ................... G06F 12/0815 711/141 |

* cited by examiner

*Primary Examiner* — Glenn A Auve
(74) *Attorney, Agent, or Firm* — Patterson + Sheridan, LLP (57) ABSTRACT

Embodiments of the present disclosure use non-blocking writes (NBWs) to send high priority information (e.g., cache writebacks) on a designated channel that is separate from a channel used for other commands (e.g., normal memory write commands). By using NBWs and a designated channel to send cache writebacks, the cache writebacks will not be blocked by normal memory write commands. For example, an endpoint device may indicate that a TLP includes an NBW. Based on the indication, the root complex may send the NBWs on a dedicated NBW channel such that the NBW is not blocked by normal memory writes.

20 Claims, 8 Drawing Sheets

PERIPHERAL COMPONENT INTERCONNECT EXPRESS (PCIE) PSEUDO-VIRTUAL CHANNELS AND NON-BLOCKING WRITES

BACKGROUND

Peripheral Component Interconnect Express (PCIe) Architecture has a mechanism for implementing virtual channels (VCs) within a PCIe port. VCs provide a means to support multiple independent logical data flows over a given common physical resource of a PCIe link. Conceptually this involves multiplexing different data flows onto a single physical link.

SUMMARY

Certain embodiments of the present disclosure provide a method performed by a first device of a PCIe communication interface. The method generally includes determining at least one memory write information to be sent to a second device via a PCIe link, encoding the memory write information in a packet with an indication of whether the memory write information is to be treated as a normal memory write or a non-blocking write, and sending the packet to the second device over the PCIe link.

Certain embodiments of the present disclosure provide a method performed by a first device of a PCIe communication interface. The method generally includes receiving a packet, from a second device of the PCIe interface, comprising memory write information, determining whether the memory write information is to be treated as normal memory-write or non-blocking write, and sending the memory-write information on a designated channel if the memory write information is to be treated as a non-blocking write based on the determination, wherein the designated channel is designated to non-blocking writes.

Certain embodiments of the present disclosure provide a Peripheral Component Interconnect Express (PCIe) communication system. The system generally includes a first device configured to determine at least one memory-write information to be sent to a second device via a PCIe link, encode the memory-write information in a packet with an indication of whether the memory write information is to be treated as a normal memory write or a non-blocking write, and send the memory-write information to the second device over the PCIe link, and a second device configured to, receive the packet, from the first device of the PCIe interface, comprising memory write information, determine whether the memory write information is to be treated as normal memory-write or non-blocking write based on the indication, send the memory-write information on a designated channel if the memory write information is to be treated as a non-blocking write based on the indication, wherein the designated channel is designated to non-blocking writes.

DETAILED DESCRIPTION

Generally, embodiments of the present disclosure use non-blocking memory writes (NBWs) to send high priority information (e.g., cache writebacks) on a designated channel that is separate from a channel used for other commands (e.g., normal memory write commands). By using a designated channel to send NBWs, the NBWs will not be blocked by normal memory write commands.

Figure 1:
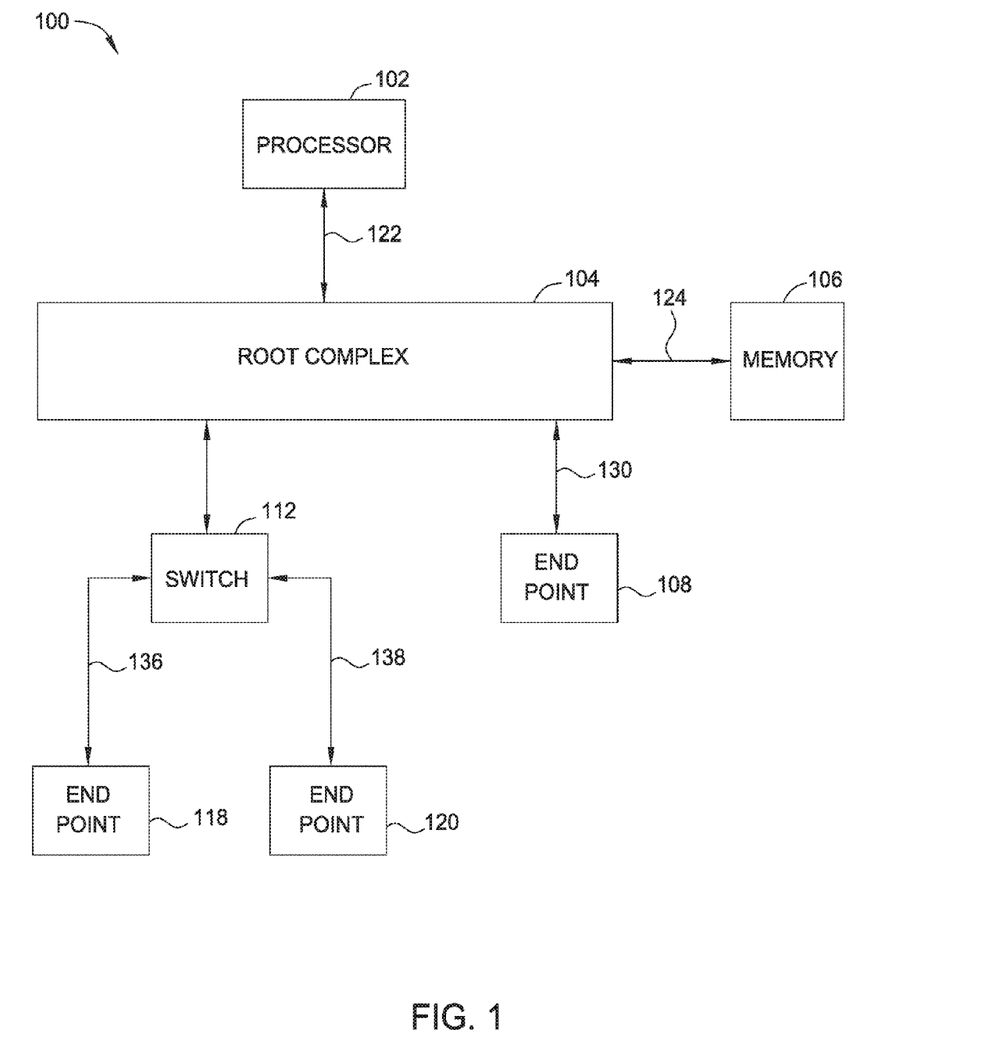
FIG. 1 illustrates a block diagram depicting an exemplary data processing system, according to certain embodiments of the present disclosure.

FIG. 1 illustrates a block diagram depicting an exemplary data processing system 100, according to certain embodiments of the present disclosure. As illustrated, data processing system 100 includes a processor 102, root complex 104, memory 106, PCI Express endpoints 108, 118, 120, and switch 112.

Root complex 104 is the root of an Input/Output (I/O) hierarchy and couples processor 102 (via interconnect 122) and memory 106 (via interconnect 124) to I/O systems such as switch 112, and PCI Express endpoint 108. PCI Express endpoint 108 represents a peripheral directly coupled to root complex 104 (i.e., without the means of a switch) via PCI Express interconnect 130. Switch 112 couples PCI Express endpoints 118 and 120 (via PCI Express interconnect 136 and 138).

Those with skill in the art will appreciate that the PCI Express endpoints may be implemented by any type of device that can be a requester or completer of a PCI Express transaction either on its own behalf or on behalf of a distinct non-PCI Express device. Moreover, those skilled in the art will appreciate that data processing system 100 can include many additional components not specifically illustrated in FIG. 1. Because such additional components are not necessary for an understanding of the present disclosure, they are not illustrated in FIG. 1 or discussed further herein. It should also be understood, however, that the enhancements to data processing system 100 for using NBWs to communicate memory write information according to certain embodiments of the present disclosure are applicable to data processing systems of any system architecture and are in no way limited to the generalized architecture illustrated in FIG. 1.

PCIe architecture has a mechanism for implementing virtual channels (VCs) within a PCIe port. VCs provide a means to support multiple independent logical data flows over given common physical resources of a PCIe Link. Conceptually this involves multiplexing different data flows onto a single physical Link.

Systems using PCIe communication may need VCs to be used as a second channel to communicate certain information. For example, the second channel may be used for memory write information (cache writebacks, for example) that cannot be blocked by normal memory writes that may be communicated on a first channel. That is, a deadlock condition can occur where specific cache writebacks are not allowed to pass I/O direct memory access (DMA) write requests because of ordering rules. For example, the write requests may share a posted channel on PCIe and thus, it is possible for the I/O DMA writes to block passage of the cache writebacks. A second channel allows these cache writebacks to flow through the design without being blocked by the I/O DMA writes.

While VCs may be used to implement a second channel in PCIe architecture, VCs introduce several complexities and problems in hardware (HW), software (SW) and firmware (FW). For example, implementing a second channel via a VC may require VC capabilities and controls in the PCI configuration space which may cost chip area. Moreover, VC capabilities and controls may affect the address map of a design to add the additional structure.

Additional link level training packets may be needed to initialize all VCs, which introduces link layer state machine complexities. VCs also introduce transaction layer implementation complexity for managing credits across multiple VCs. Moreover, VC logic may have to be implemented on both ends of a PCIe link, e.g., in both the root and endpoint devices.

Using a VC as a second channel may also need SW/FW changes. That is, SW/FW may have to be used to set up the VC capabilities and controls in the PCI configuration space. In addition, SW/FW may have to initiate separate VC credit initialization sequences for each VC. High level SW/FW initialization coordination between root complex and endpoint may also be needed. VCs in the root complex may have to be enabled before transaction layer packets (TLPs) are received from an endpoint to prevent malformed TLP errors.

In addition, the VC mechanism is not a typically supported option in the industry in many devices. For example, many PCIe switch vendors do not support VCs or only support VCs in a limited manner. This limitation may make certain system designs using VCs impractical.

Embodiments of the present disclosure are generally directed to distinguishing between NBWs and normal memory writes to effectively create a pseudo-virtual channel (VC) for PCIe communication. The NBWs may be used to communicate cache writebacks, while normal memory write TLPs may be used to communicate DMA writes (e.g., normal writes). NBWs may be encoded with special bits in the address field to indicate that they are to be treated as NBWs and routed using a designated channel such that they are not blocked by normal memory writes.

In certain aspects, NBWs may share posted channel with memory write TLPs. NBWs may be ordered on the PCIe link, but can pass normal memory writes in the Root Complex. That is, NBWs may be assigned to a separate channel from normal memory writes in the Root Complex such that they are not blocked by normal memory writes. Using NBWs as a means to implement a second channel may need minimal HW changes in the root complex and endpoint as will be described in more detail with respect to FIGS. 2-3.

Figure 2:
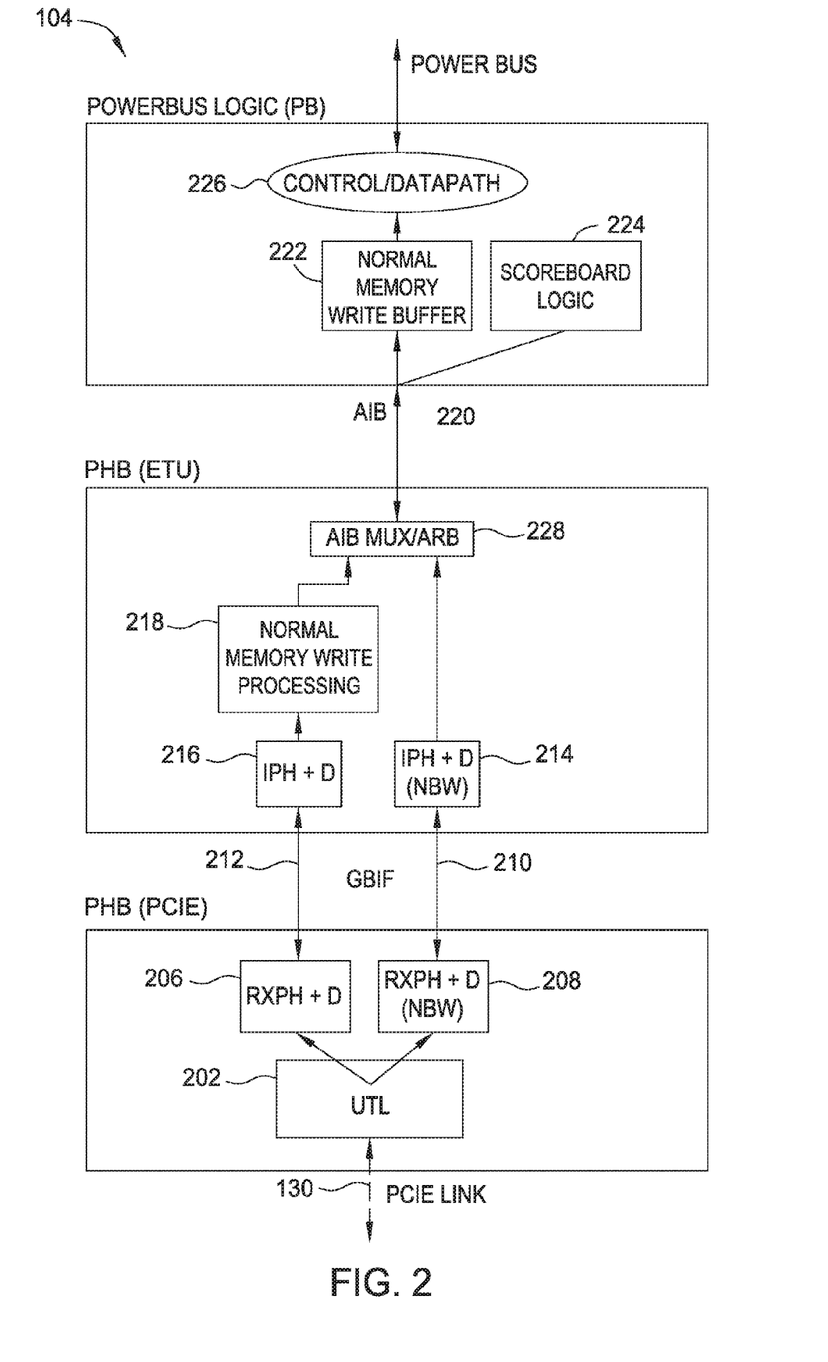
FIG. 2 illustrates a block diagram of a root complex device, according to certain embodiments of the present disclosure.

FIG. 2 illustrates a block diagram of a root complex 104 configured to implement a second channel using NBWs, according to certain embodiments of the present disclosure. As illustrated, a PCIe host bridge (PHB) may include an upper transaction layer (UTL) 202 where inbound PCIe TLPs, received via PCIe link 130, may be decoded. Inbound TLPs may be split and stored in designated buffers by the PCIe/UTL logic. For example, the UTL logic may determine that a memory write TLP is an NBW TLP based on an indication in the TLP (e.g., in the address field of the TLP). Memory write header and data may be placed in a receive posted header and data (RXPH+D) buffer 206 (e.g., designated to normal memory rites), and NBW TLPs may be placed in a separate RXPH+D buffer 208 that is designated for NBWs. In certain embodiments, buffer 208 may be a duplicate of the buffer 206 used for memory writes for logic simplicity. That is, buffer 208 may be a same size as buffer 206. A dedicated global bus interface (GBIF) write interface 210 may be dedicated to NBWs. Thus, no ordering may be necessary between NBWs and normal memory writes (e.g., DMA writes) which use a separate GBIF write interface 212.

The root complex 104 also includes a dedicated inbound posted header and data (IPH+D) buffer 214 for NBWs in the PHB express transaction unit (ETU). That is, IPH+D buffer 214 for NBWs is a separate buffer than IPH+D buffer 216 used for normal memory writes. In certain embodiments, buffers 214 and 216 may be small, e.g., each storing up to two write requests for the GBIF interface. As illustrated, NBW writes skip normal pipeline processing for normal memory writes, performed at 218 in the ETU. Thus, NBWs are not ordered with normal memory writes. The processed normal memory writes and NBW are then multiplexed via an adaptive interface board (AIB) multiplexer and arbiter (ARB). The NBW writes are then assigned to a separate AIB channel than DMA writes, allowing the NBW writes to pass DMA writes at the MB interface 220. For example, NBW writes may use channel 3 while DMA writes may use channel 0.

The root complex 104 also includes PowerBus Logic (PB), which includes a normal memory write buffer 222 that may be shared with NBW writes. However, a PB scoreboard logic 224 may be configured to allow NBW writes to pass normal memory writes to the PowerBus. For example, the PB scoreboard logic 224 may reserve at least one buffer slot for NBW writes such that normal memory writes do not block NBW writes. In certain embodiments, the output of the normal memory write buffer 222 is coupled with a control and data path 226 configured to send the normal memory writes and NBW writes to the PowerBus.

Figure 3:
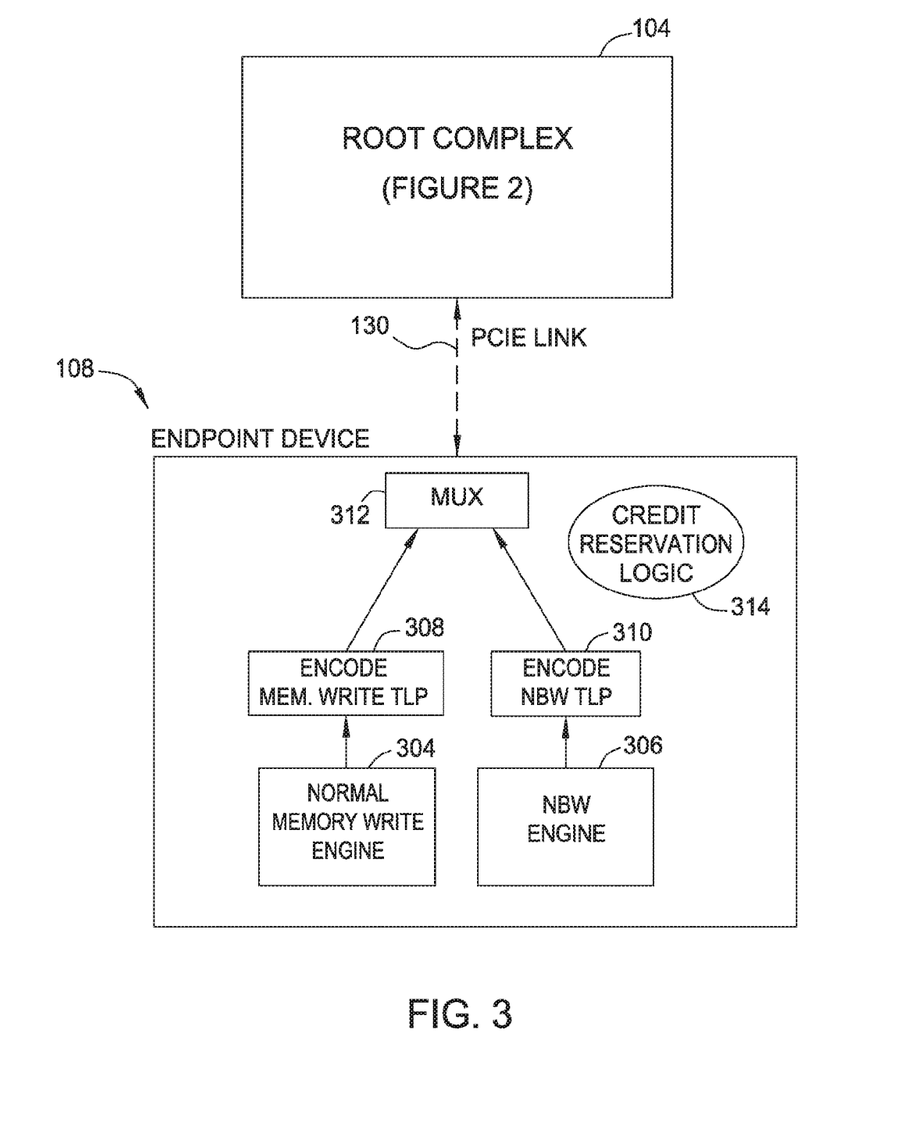
FIG. 3 illustrates a block diagram of an end point device, according to certain embodiments of the present disclosure.

FIG. 3 illustrates a block diagram of an end point device 108 configured to implement a second channel using NBWs, according to certain embodiments of the present disclosure. In certain embodiments, the end point device is directly attached to a root complex via a PCIe link 130. The end point device 108 may include a normal memory write engine 304 configured to generate normal memory writes, which may be encoded as memory write TLPs via the encoder logic 308. The endpoint device 108 may also include a NBW engine 306 to generate NBWs (e.g., cache writebacks), and logic 308 for encoding the cache writebacks as NBW TLPs. The normal memory write TLPs and the NBW TLPs are multiplexed via a multiplexer 312, and sent via the PCIe link 130 to the root complex 104, as described with respect to FIG. 2.

In certain embodiments, the endpoint 108 also comprises credit reservation logic 314 configured to reserve a credit for the NBW writes in an effort to prevent NBWs from being blocked by the normal memory writes. Generally, credits are used to indicate a number of TLPs that, for example, the end point 108 can send to the root complex 104. PCIe credits may be split into separate header and data credits for each type of transmission (e.g., posted, non-posted, completion). Endpoint 108 may be given a certain credit limit, and the endpoint 108 may only be allowed to send TLPs as long as sending the TLP would not result in the endpoint 108 exceeding its credit limit. Thus, in an effort to ensure that the endpoint 108 does not consume all of its available credits by sending normal memory writes, resulting in a block of NBW transmissions, the endpoint 108 credit reservation logic 314 may be configured to reserve a credit for NBWs. That is, the credit reservation logic 314 may ensure that the endpoint 108 only sends TLPs until at least one credit is left for NBWs to consume. Therefore, in certain embodiments, the credit reservation logic 314 may be configured to reserve a last credit of the available credits for the NBW TLPs.

Turning back to FIG. 2, the root complex 104 may be configured to return a number of credits to the endpoint 108, which indicates a number of TLPs that the endpoint 108 can receive. This indication may be based on a number of available slots in buffers configured to store the normal memory writes and NBW TLPs. In certain embodiments, the root complex 104 may be configured to combine a number of allowed credits for normal memory writes and NBW TLPs to determine a total number of available credits, which the root complex will return (e.g., indicate) to the endpoint device 108.

In certain embodiments, the posted header buffer of the IPH+D buffer 214 (NBW buffer) may reflect the number of posted header credits advertised. In certain embodiments, the data buffer of the IPH+D buffer 214 (NBW buffer) may be a different size than the normal memory writes (e.g., DMA writes) data buffer of the IPH+D buffer 216. That is, in certain embodiments, there may be a maximum payload size for NBWs, which may be smaller than the maximum payload size of normal writes. Therefore, the size of the data buffer for NBWs (e.g., data buffer of IPH+D buffer 214) may be selected based on a number of headers times a maximum NBW payload size. By using a data buffer for the IPH+D buffer 214 (NBW buffer) that is smaller than a data buffer of the IPH+D buffer 216 (normal memory write buffer), the amount of area consumed by the IPH+D buffer 214 may be reduced.

EXAMPLE CREDIT RESERVATION LOGIC

In some cases, the endpoint device 108 may have access to the internal PCIe credits currently used at the PCIe communication interface. Thus, it may be able reserve one header and enough posted data credits to send NBWs. For example, the end point device may reserve a last of the available credits for sending memory writes such that only NBWs can consume the last header and data credits as described above. However, the endpoint device 108 interface logic may not supply or expose available PCIe credits to internal logic of the endpoint device 108 in all implementations. Thus, certain embodiments of the present disclosure provide a higher level credit scheme using credit return write (CRW) TLPs which may be used in a case where the internal logic of the endpoint device does not have access to the PCIe credit information. That is, the endpoint credit reservation logic may be configured to maintain a credit count that is separate from the PCIe link level credits using CRW packets that are generated by and received from the root complex 104.

Figure 4:
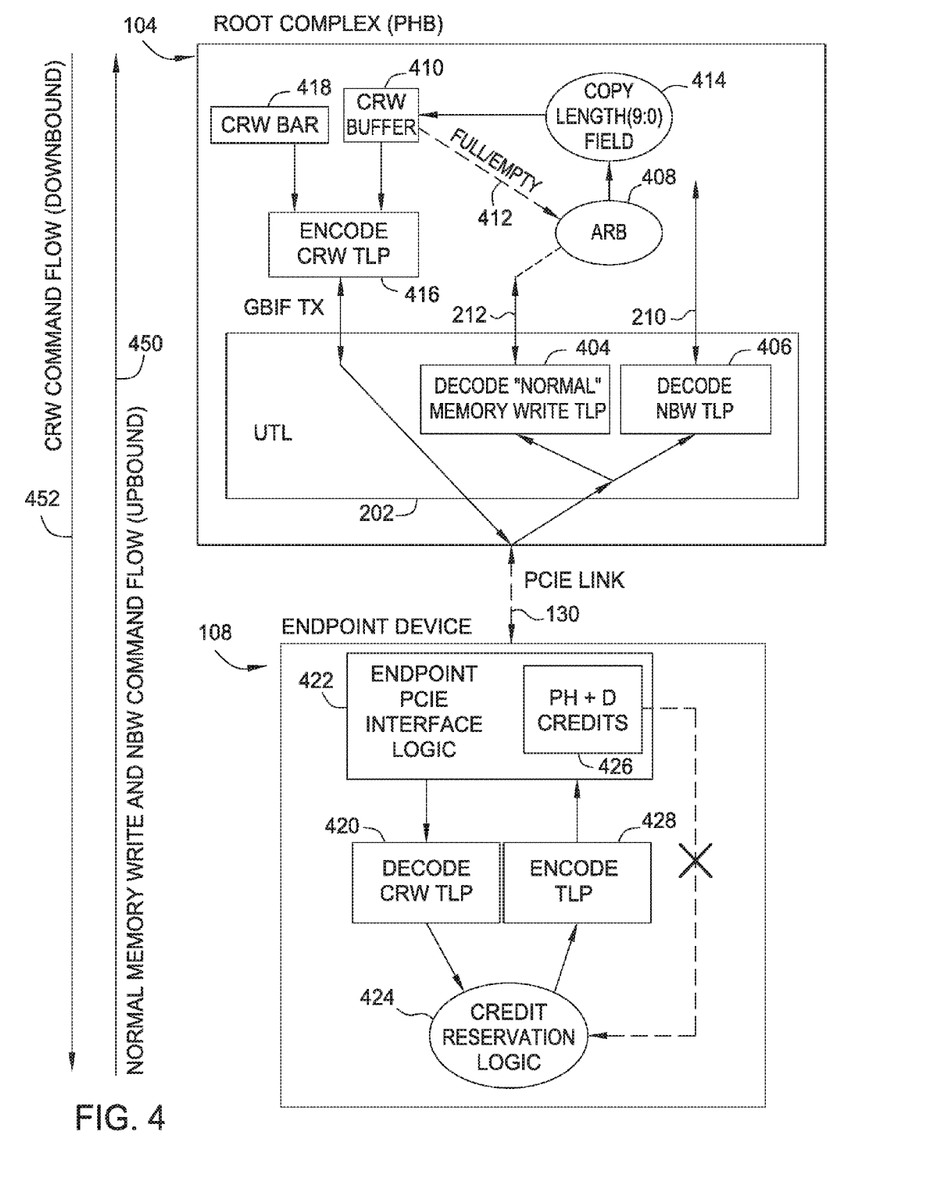
FIG. 4 illustrates a block diagram of a root complex and end point device configured to implement a credit reservation scheme, in accordance with certain embodiments of the present disclosure.

FIG. 4 illustrates a block diagram of a root complex device 104 and endpoint device 108 configured to implement a new credit reservation scheme, in accordance with certain embodiments of the present disclosure. As presented above, the root complex 104 may receive TLPs from the endpoint device 108, which may be decoded separately by the UTL 202. For example, the UTL 202 may include a decoder 404 for decoding normal memory write TLPs, and another decoder 406 for decoding non-blocking writes.

As described earlier, the NBW may be sent via a designated channel (e.g., GBIF interface 210) and the normal memory writes TLPs may be sent via a separate channel (e.g., GBIF interface 212). However, to implement the new credit reservation scheme, the GBIF interface 212 may indicate a last fragment of a TLP (e.g., where the TLP is split into multiple fragments by the UTL 202) and pass the Length field from the TLP to an ARB 408. The Length field indicates the payload size of the TLP (e.g., in 4 byte dwords). The ARB 408 determines whether a CRW buffer 410 has a free slot. That is, the ARB 408 may stall up-bound (as indicated by arrow 450) memory write TLPs until a free CRW buffer slot is available (e.g., as indicated by a feedback signal 412 from the CRW buffer 410). If the CRW buffer 410 has a free slot, the Length field of the TLP may be written or copied to the CRW buffer 410 via logic 414.

The root complex 104 also includes an encoder 416 to encode CRW TLPs. That is, the encoder 416 may generate a CRW TLP that includes the Length field copied to the CRW buffer 410, to be sent back to the endpoint device 108. In certain aspects, the CRW TLP generated by the encoder 416 may include an indication to the endpoint device 108 that the TLP is a CRW TLP. In certain aspects, the indication may be via a target address of the TLP indicating a target memory address in the endpoint device 108. For example, the encoder 416 may receive the target address from a firmware programmable CRW base address register (BAR) 418. That is, the CRW BAR register 418 indicates the target address of BAR space in the down-bound direction (e.g., as indicated by arrow 452, which may be memory-mapped I/O (MMIO) writes), which enables the CRW TLP to match the endpoint's MMIO BAR space. In certain aspects, the upper 64 bits of the PCIe address in the CRW TLP may be set to a firmware programmable value received from the CRW BAR register 418. Once the CRW TLP is generated by the encoder 416, it may be sent to the endpoint device 108 in order to provide a credit to the endpoint device 108 to send another normal memory write TLP.

As illustrated, the end point device 108 may include a decoder 420 configured to receive the CRW TLP via PCIe interface logic 422 and through PCIe link 130. As described above, the PCIe interface logic may include a PH+D credits buffer 426 to track credits based on a standard PCIe flow control scheme. However, the endpoint device 108 PCIe interface logic 422 may not supply or expose available PCIe credits to internal logic (e.g., the credit reservation logic 424) of the endpoint device 108 in all implementations, as described above. Thus, the credit reservation logic 424 has the option of using the local PCIe credits from the PH+D credits buffer 426 when available, or the separately track credits via the CRW TLPs generated by and received from root complex device 104.

For example, using the CRW TLPs received from root complex 104, the credit reservation logic 424 of endpoint device 108 may track up-bound normal memory writes (e.g., DMA writes). That is, the credit reservation logic 424 may track a total number of TLP headers issued and a total number of payload bytes issued. In certain aspects, the credit reservation logic 424 may send normal memory writes (e.g., via an encoder 428) until all the available credits as tracked by the endpoint device 108 are consumed. That is, the credit reservation logic 424 may maintain an internal pool of credits to track and send normal memory writes up to a firmware programmable limit. At this point, the credit reservation logic 424 may wait until a CRW TLP is received which may provide at least one header credit and a number of payload credits. This may be specified by CRW data payload bytes of the CRW TLP which includes the Length field of a last normal memory write processed at the root complex 104 (e.g., from the CRW buffer 410). Then, the endpoint device 108 can continue to send normal memory write TLPs until the amount of credits indicated by the CRW TLP is consumed.

In certain aspects, the credit reservation logic 424 may reserve at least one header and a number of data credits for sending NBWs such that NBWs do not get blocked by normal memory writes. As NBWs are routed in the root complex 104 using a designated channel, the number of header and data credits consumed by NBWs may not be tracked by the credit reservation logic 424.

In certain aspects, the number of credits returned as indicated by the CRW TLP may be computed by the endpoint device 108 via the following equation:

$$\text{Data Credit Count} = \text{ceiling}\left(\frac{\text{Length} \times 4}{16}\right)$$

where Length indicates payload size in 4 byte dwords and each PCIe data credit is 16 bytes. The ceiling function rounds up the data credit count to next whole integer number of credits. The ceiling function may be implemented in hardware. For example, the value of Length field may be truncated by 2 bits providing the value in 4 dwords. Bits 2-9 of the Length field may be used as the data credit count; however, if the first two least significant bits of the Length field are not zero, then the data credit count may also be incremented by one.

It is important to note that if the endpoint device 108 stops processing down-bound writes from the root complex device 104, this may halt up-bound progress of normal memory writes. However, this may not impact the NBWs because they do not depend on the CRW credit pool.

Figure 5:
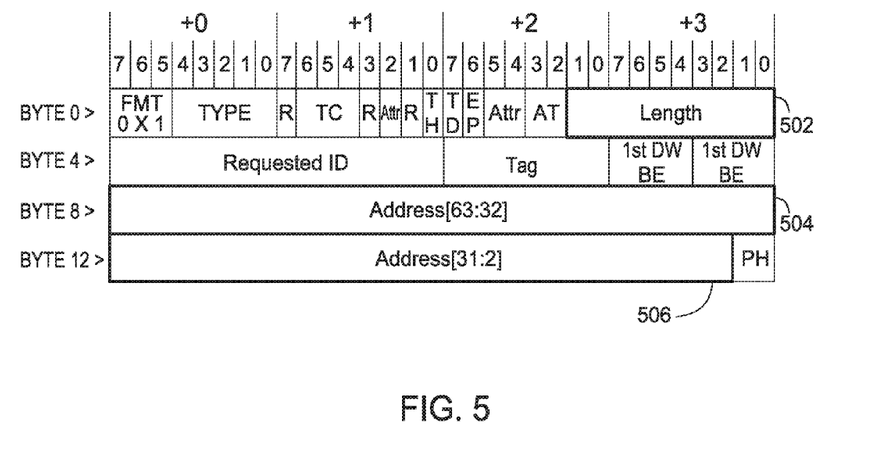
FIG. 5 illustrates a PCIe transaction layer packet (TLP) header format for 64-bit addressing of memory.

FIG. 5 illustrates a PCIe TLP Header format for 64-bit addressing of memory. A NBW TLP and a normal memory write TLP in the up-bound direction (e.g., sent from endpoint device 108 to root complex device 104) may include a Length field 502 which indicates the payload size of the NBW or normal memory write TLPs. The value of the Length field 502 may be copied into CRW data payload bytes of a CRW TLP in the down-bound direction via logic 414, as described above.

The upper address bits 504 may be used to encode special information for a pseudo-VC scheme of the present disclosure in both up-bound and down-bound directions. A number of bits of the address field 504 may be used to indicate that a TLP is a NBW. That is, the root complex device 104 may determine that a TLP is NBW or a normal memory write using address bits within the posted write command. For example, a firmware programmable register may match an expected 16 bit value for NBW command. A mask may be used to mask off address bits that do not contribute to a compare of the NBW command with the programmable register. Then, a compare of the masked result may be used to indicate that packet is NBW or a normal memory write. The lower address bits 506 may contain special encoding for CRW in the down-bound direction.

Sending CRW TLPs as described with respect to FIG. 4 may consume more bandwidth than using the standard PCIe credit scheme. For example, the bandwidth overhead with using the credit reservation scheme as described herein may be as high as 6% in a heavily loaded system, assuming one CTW TLP is returned from the root complex device 104 for each normal memory write in the up-bound direction. This overhead may have a negative effect on normal memory write read response bandwidth. Moreover, the CRW scheme introduced herein may introduce credit return latency. That is, the endpoint device 108 may wait for CRW TLPs in order to reclaim credits before sending normal memory writes. In certain aspects, normal memory writes may be throttled in the up-bound direction if CRW TLP response time is too long.

Aspects of the present disclosure provide techniques to reduce the bandwidth consumption of the credit reservation scheme presented herein. For example, the root complex device 104 may be configured to gather a number of CRWs for multiple normal memory writes before sending a CRW TLP to the endpoint device 108 instead of returning one CRW TLP for each and every up-bound normal memory write. For example, as normal memory write TLPs are received by the root complex 104, the value of the Length field of the normal memory write TLP may be added (e.g., via an adder/accumulator) to the CRW buffer 410.

When a certain number of normal memory write TLPs are received and a respective number of length fields have been added to the CRW buffer 410, the encoder 416 may generate a CRW packet to be sent back to the endpoint device 108. That is, the CRW packet may be encoded by encoder 416 to include an indication a sum of all Length fields of the normal memory write TLPs received since a previous CRW packet was generated. The CRW packet may also indicate a total number of header credits corresponding to the number of the normal memory writes received since a previous CRW TLP transmission.

When adding/accumulating multiple TLPs for CRWs as described, the Length value added to the accumulated value may have a floor of sixteen Bytes or rounded up to an integer multiple of sixteen Bytes (e.g., Length of four). The reason for this is to account for individual, small TLPs and to compute an accurate data credit count at the endpoint 108. For example, if two small TLPs with Length of one are accumulated, simply adding the Lengths together would result in an accumulated Length of two which would compute to a single data credit instead of two data credits, which may be incorrect. Rather, each small TLP may use one data credit. Thus, when accumulating multiple TLPs into a CRW, the Length added may be a multiple of Length of four or sixteen Bytes. In this example, the accumulated Length would be eight and the data credit count would compute to two.

In certain aspects, once a total of four normal memory write TLPs have been received, a CRW packet may be sent back to the endpoint device 108. The number of CRWs gathered may be programmable via a hardware register. In certain aspects, a hardware watchdog timer may be used to generate the CRW TLP including the sum of Length fields of received normal memory write headers after a certain amount of time has passed.

Figure 6:
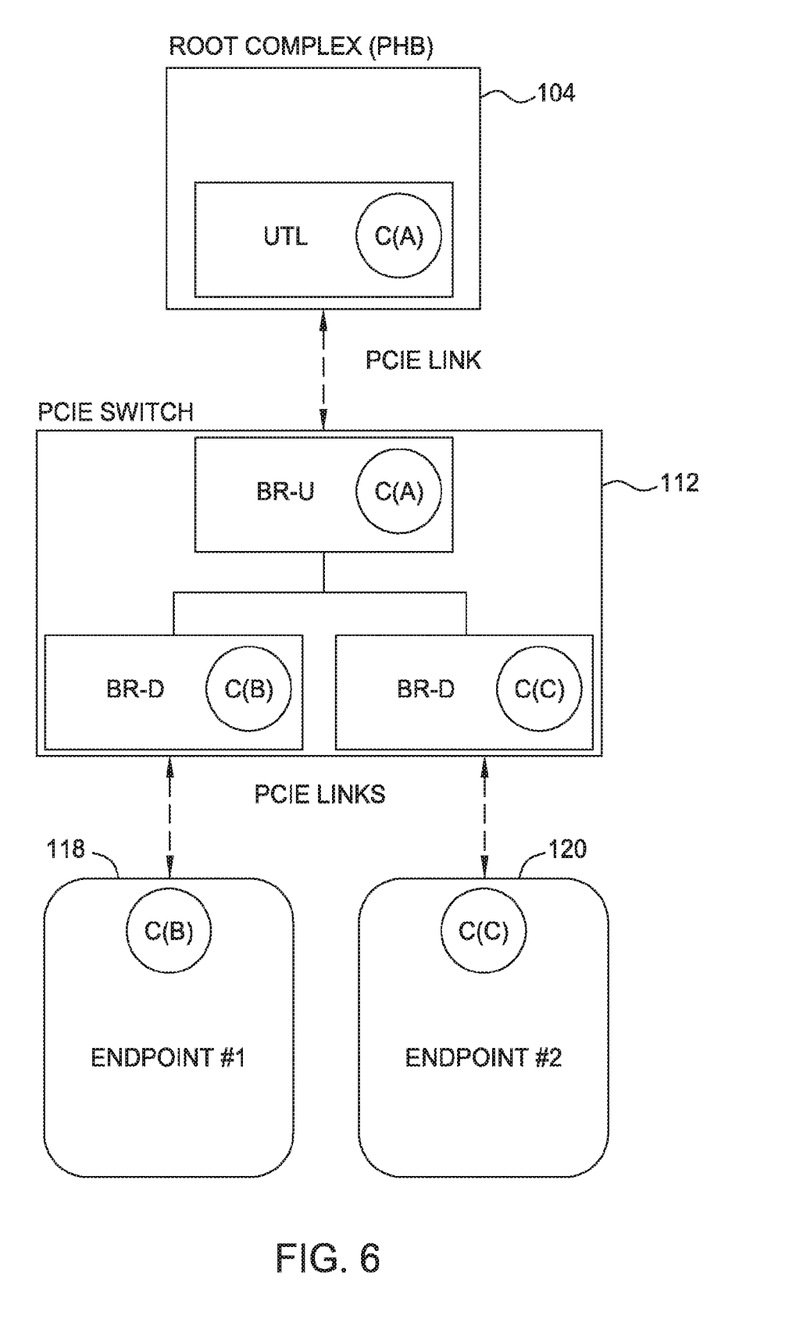
FIG. 6 illustrates a block diagram depicting an exemplary data processing system with a PCIe switch, according to certain embodiments of the present disclosure

FIG. 6 illustrates a block diagram depicting an exemplary data processing system 600 with a PCIe switch, according to certain embodiments of the present disclosure. As discussed with respect to FIG. 1, a root complex 104 may communicate with end point devices 118 and 120 via a switch 112. PCIe communication through a switch may present a problem for a link credit management scheme. For example, PCIe link credits and flow control may be managed on a link, point to point basis.

However, the endpoint device(s) PCIe interface logic may not have direct visibility to the advertised credits C(A) by the root complex at the upstream bridge (BR-U) port. Rather, the end point device may only be aware of the link credits C(B) or C(C) negotiated with the downstream bridge (BR-D) ports of the switch for each of endpoint devices 118, 120. Thus, each endpoint device may not be able to use link credits to manage flow control while implementing pseudo-VC scheme. However, in this scenario, the CRW credit scheme as described herein may used instead.

For example, firmware may be used to allocate root complex credits across all endpoint devices in the PCIe switch topology. Firmware may program the maximum allowed normal memory write header and data credits in each endpoint. That is, the total credits across all endpoint devices should not exceed the total credits allowed by the root complex. Allocation across endpoints can be evenly spread or skewed depending on bandwidth requirements of each endpoint device. Credit limits of each endpoint may limit the respective bandwidth for sending normal memory writes, but only in a case where one endpoint is relatively idle because bandwidth is split between endpoints in a switch topology.

It should be noted that the response time for sending and receiving CRW TLPs is longer in a switch topology. Thus, the longer response time may limit normal memory write performance if the latency is too large.

In certain aspects, the root complex 104 may send CRWs to multiple endpoint devices. Thus, multiple CRW BAR registers may be used to indicate target addresses for each of the multiple endpoint devices.

While examples provided herein have described sending cache writebacks using NBWs to facilitate understanding, persons of ordinary skill in the art will understand that embodiments of the present disclosure may be used to communicate any information between a root complex and an end point device in order to prevent the information from being blocked by normal memory writes.

Figure 7:
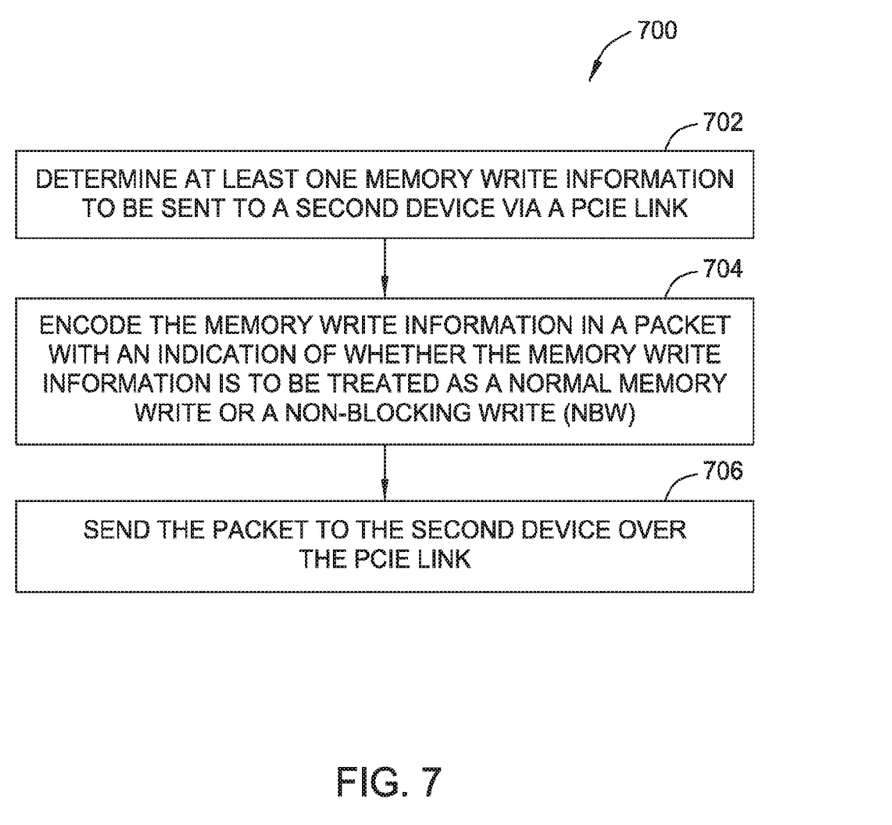
FIG. 7 illustrates example operations for sending memory write information, in accordance with embodiments of the present disclosure.

FIG. 7 illustrates example operations 700 for sending memory write information (e.g., a cache writeback), in accordance with embodiments of the present disclosure. The operations 700 may be performed, for example, by a first device, such as the endpoint device 108.

The operations 700 begin, at 702, by determining at least one memory write information to be sent to a second device via a PCIe link. At 704, the end point device encodes the memory write information in a packet with an indication of whether the memory write information is to be treated as a normal memory write or a non-blocking write and, at 706, sends the packet to the second device over the PCIe link.

Figure 8:
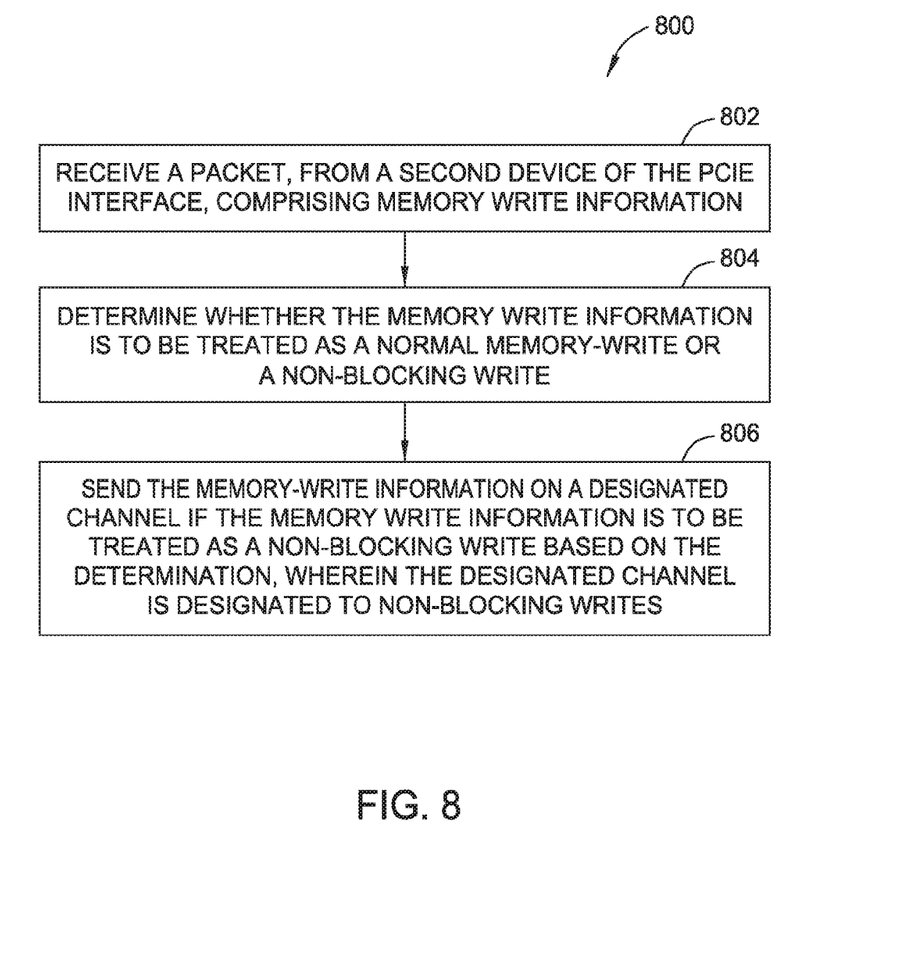
FIG. 8 illustrates example operations for receiving memory write information, in accordance with embodiments of the present disclosure.

FIG. 8 illustrates example operations 800 for receiving memory write information (e.g., a cache writeback), in accordance with embodiments of the present disclosure. The operations 800 may be performed, for example, by a first device, such as the root complex device 104.

The operations 800 begin, at 802, by receiving a packet, from a second device of the PCIe interface, comprising memory write information. At 804, the root complex device determines whether the memory write information is to be treated as normal memory-write or non-blocking write and, at 806, sends the memory-write information on a designated channel if the memory write information is to be treated as a non-blocking write based on the determination, wherein the designated channel is designated to non-blocking writes.

While examples provided herein have described sending memory write information (e.g., cache writebacks) as non-blocking writes to facilitate understanding, persons of ordinary skill in the art will understand that embodiments of the present disclosure may be used to communicate any information between a root complex and an end point device in order to prevent the information from being blocked by other communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method performed by a first device of a Peripheral Component Interconnect Express (PCIe) communication interface, comprising:
   determining at least one memory write information to be sent to a second device via a PCIe link;
   encoding the memory write information in a packet with an indication of whether the memory write information is to be treated as a normal memory write or a non-blocking write; and
   sending the packet to the second device over the PCIe link.

2. The method of claim 1, wherein the indication is in an address field of the packet.

3. The method of claim 1, further comprising:
   receiving a credit return write (CRW) packet indicating at least one credit, wherein each credit allows a number of packets for the first device to send to the second device; and
   determining whether to send the memory write information that is to be treated as a normal memory write based on the CRW packet.

4. The method of claim 3, wherein determining whether to send the memory write information that is to be treated as a normal memory write comprises reserving at least one of the at least one credit for sending non-blocking writes.

5. The method of claim 1, wherein the non-blocking write comprises cache writebacks.

6. The method of claim 1, wherein the first device comprises an end point device, and the second device comprises a root complex device.

7. A method performed by a first device of a Peripheral Component Interconnect Express (PCIe) communication interface, comprising:
receiving a packet, from a second device of the PCIe interface, comprising memory write information;
determining whether the memory write information is to be treated as normal memory-write or non-blocking write; and
sending the memory-write information on a designated channel if the memory write information is to be treated as a non-blocking write based on the determination, wherein the designated channel is designated to non-blocking writes.

8. The method of claim 7, wherein determining whether the memory write information is to be treated as a normal memory write or a non-blocking write is based on an indication in an address field of the packet.

9. The method of claim 7, further comprising:
determining whether a credit return write (CRW) buffer comprises at least one free buffer slot for the memory write information if the memory write information is to be treated as a normal memory write; and
writing at least a portion of the memory write information to the CRW buffer.

10. The method of claim 9, wherein the portion of the memory write information comprises a length field of the memory-write information indicating a payload size of the memory-write information.

11. The method of claim 7, further comprising:
encoding a credit return write (CRW) packet with CRW information indicating a number of packets allowed for the second device to send to the first device; and
sending the CRW packet to the second device.

12. The method of claim 11, wherein the CRW information comprises a length field of the received packet or a sum of the length field of the received packet and a length field of at least one other previously received packet.

13. The method of claim 11, further comprising indicating that the CRW packet comprises the CRW information.

14. The method of claim 13, wherein indicating that the CRW packet comprises the CRW information comprises indicating that the CRW packet comprises the CRW information via a target address of the CRW packet.

15. A Peripheral Component Interconnect Express (PCIe) communication system, comprising:
a first device configured to:
determine at least one memory-write information to be sent to a second device via a PCIe link;
encode the memory-write information in a packet with an indication of whether the memory write information is to be treated as a normal memory write or a non-blocking write; and
send the memory-write information to the second device over the PCIe link; and
a second device configured to:
receive the packet, from the first device, comprising memory write information;
determine whether the memory write information is to be treated as normal memory-write or non-blocking write based on the indication;
send the memory-write information on a designated channel if the memory write information is to be treated as a non-blocking write based on the indication, wherein the designated channel is designated to non-blocking writes.

16. The system of claim 15, wherein the first device is further configured to:
receive a credit return write (CRW) packet from the second device indicating at least one credit, wherein each credit allows a number of packets for the first device to send to the second device; and
determining whether to send the memory write information that is to be treated as a normal memory write based on the CRW packet.

17. The system of claim 16, wherein determining whether to send the memory write information that is to be treated as a normal memory write comprises reserving at least one of the at least one credit for sending non-blocking writes.

18. The system of claim 15, wherein the second device is further configured to:
determining whether a credit return write (CRW) buffer comprises at least one free buffer slot for the memory write information if the memory write information is to be treated as a normal memory write; and
writing at least a portion of the memory information to the CRW buffer.

19. The system of claim 18, wherein the portion of the memory-write information comprises a length field of the memory-write information indicating a payload size of the memory-write information.

20. The system of claim 15, wherein the second device is further configured to:
encode a credit return write (CRW) packet with CRW information indicating a number of packets allowed for the first device to send to the second device; and
send the CRW packet to the first device.

* * * * *